R. GROTZ.
Grain Drier.
No. 94,308.  Patented Aug. 31, 1869.
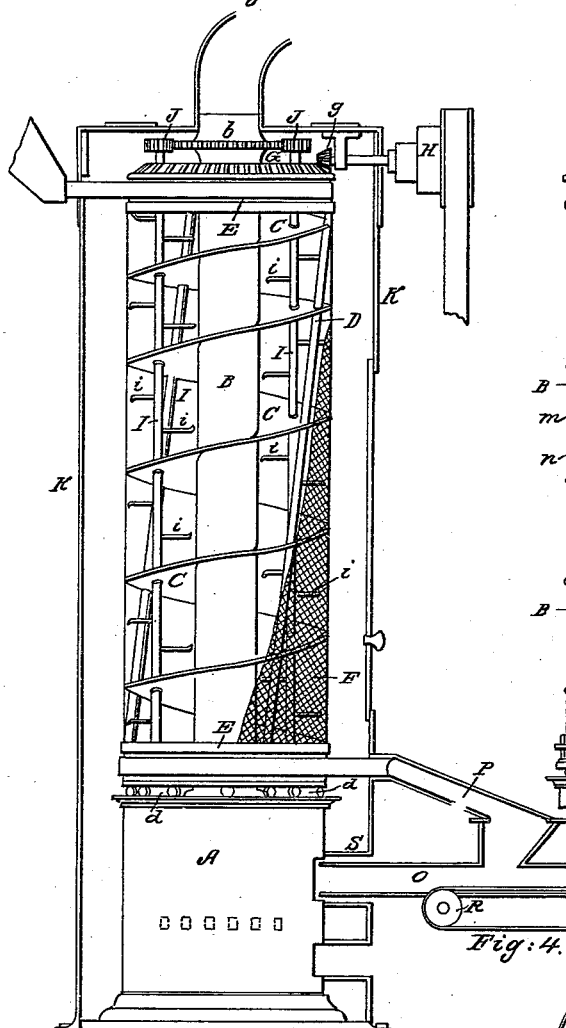
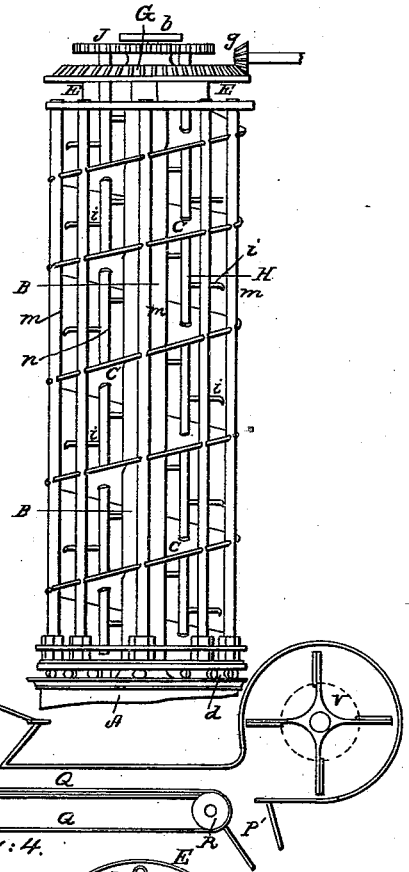
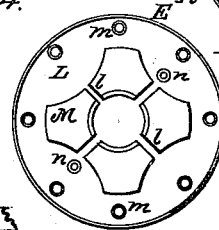
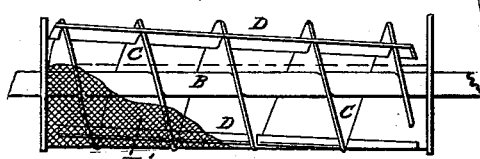
Witnesses:
Inventor:

REMIG GROTZ, OF CHICAGO, ILLINOIS.

Letters Patent No. 94,308, dated August 31, 1869.

GRAIN-DRIER.

The Schedule referred to in these Letters Patent and making part of the same.

*To all whom it may concern:*

Be it known that I, REMIG GROTZ, of the city of Chicago, in the county of Cook, and State of Illinois, have invented certain new and useful Improvements in "Grain-Driers;" and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

Figure 1 represents the side elevation of the apparatus;

Figure 2 represents the same arranged for steam;

Figure 3 is the plan of the upper head of the apparatus heated by steam, in cross-section;

Figure 4 is the blasting and conveying-apparatus; and

Figure 5 is the side elevation of the drying-apparatus, in which the worm is secured to the smoke-stack, both revolving inside of a perforated cylinder.

The nature of my invention consists in the application of the endless screw or worm-flange to the drying, cooling, elevating, and conveying malt, grain, and other similar substances.

It consists also in placing the furnace smoke-pipe or stack in the centre of the drying-apparatus, to heat the same.

Also, in the application of cold blast, becoming hot after passing through the heated mass of malt, grain, &c., as hot blast to the heating-furnace of the apparatus.

Also, in the application and arrangement of steam-pipes to heat the drying-apparatus, in the manner as will be hereinafter fully explained.

A is a furnace, and

B is a smoke-pipe, or stack, strongly secured to the furnace, and provided at the top with cog-wheel *b*.

C is a broad endless screw, or worm-flange, coiled around the stack B, and stiffened by bars D D, the whole connected with the heads E E, and surrounded with perforated-metal or wire-gauze cylinder F.

The circular heads E E being provided with journals for the pipe B, the apparatus rests on the rollers *d d*, placed between its lower head and the furnace, and is revolved around the pipe B by means of bevel-gear G, pinion *g*, and conical pulley H, to which power is applied.

I I are the rods, journalled to the heads E E, and bearing beaters *i i*, of suitable shape.

They are provided at the top with pinions, J J, gearing into cog-wheel *b*, so that while the whole cylinder and apparatus revolve around pipe B, rods I I revolve around their own axis, thereby operating the beaters, which scatter the grain as it follows the endless flange C.

The apparatus is provided, at the top and bottom, with proper spouts to receive and discharge the grain, and the whole is enclosed in a stationary outside cylinder, K, provided with a sliding door, *k*.

When the apparatus is used in a horizontal position, the door *k* is placed at the bottom of the cylinder, and is used for discharging dust and other impurities accumulating in cylinder K.

It is obvious that the apparatus, so constructed and revolving, will convey grain entering at one end of it to the other end of the same, in whatever position the apparatus is placed, vertical, horizontal, or slanting, and that it can be used just as well for the grain-elevating as for the grain-conveying purposes.

The furnace for drying-purposes shall always be suitably constructed, according to the position of the apparatus.

When steam is used, pipe B', connected with steam-chamber or boiler, serves as a main, and the upper head E being provided with chamber L, communicating with the main by passages *l l*, made through the spider M and pipe B', the steam is distributed through pipes *m m*, which, in this case, answer the bars D D, stiffening the endless worm C.

Also, steam-pipes, *n n*, are substituted for rods I I, bearing grain-beaters *i i*.

When desirable, the endless worm C, stiffened by bars D D, may be secured to the pipe B, which, in this case, instead of being stationary, is journalled to the furnace and suitable supports, the worm and the pipe thus making one fixture, and revolving inside of a stationary perforated or wire-gauze cylinder, F, or half a cylinder, F', if the apparatus is placed in a horizontal position, as represented on fig. 5.

The cooling of the grain may be produced by the apparatus constructed as above described, except that the furnace and stack B are dispensed with, and a shaft substituted in place of the last; but it may be also effected by a blasting-apparatus, O, represented in fig. 4, and attached to the drier.

The spout *o*, of this apparatus, is connected with the fire-door S, of the furnace A, and the apparatus is provided with spouts P P', to receive and discharge the substances dried, coming from the drier, and conveyed through the blasting-apparatus by endless belt or apron Q, the upper part of which passes through the spout *o*, and the apron being operated by one of the pulleys R R.

The purpose of the apparatus is to cool the heated substances as they are conveyed by the apron Q, by the cold blast produced by the fan V, which blast, after passing through the mass of heated substances, becomes hot itself, and entering the furnace, acts as hot blast, and economizes the fuel.

What I claim as new, and desire to secure by Letters Patent, is—

1. The revolving screw C, having a pipe, B, arranged to convey heated air or steam through its centre, substantially as described.

2. The rods I I, provided with beaters $i$ $i$, arranged and operating as set forth.

3. The driving of the cold blast through a mass of heated malt, grain, &c., into the fire of the furnace, substantially as and in the manner set forth, or in other equivalent manner.

4. The application of steam-pipes B', $m$ $m$, and $n$ $n$ to the herein-described drying-apparatus, in the manner substantially as herein set forth and specified, or in any other equivalent manner.

REMIG GROTZ.

Witnesses:
 J. B. TURCHIN,
 G. A. MARINER.